United States Patent [19]
Jones

[11] Patent Number: 5,842,667
[45] Date of Patent: Dec. 1, 1998

[54] VERTICAL TAKEOFF AND LANDING MASS TRANSIT SYSTEM AND METHOD

[76] Inventor: Tommy Lee Jones, 7035 Hwy. 6 S., No. 404, Houston, Tex. 77083

[21] Appl. No.: 222,643

[22] Filed: Mar. 31, 1994

[51] Int. Cl.⁶ ........................................................ G04F 8/00
[52] U.S. Cl. .................. 244/114 R; 244/12.1; 244/23 R; 244/12.5; 244/12.4; 244/62; 244/63
[58] Field of Search ................................ 244/12.1, 23 R, 244/12.5, 12.4, 114 R, 62, 63

[56] References Cited

U.S. PATENT DOCUMENTS

| | | | |
|---|---|---|---|
| 1,818,841 | 8/1931 | Callison | 244/114 R |
| 1,921,043 | 8/1933 | Roth | 244/23 R |
| 2,387,527 | 10/1945 | Nagamatsu | 244/118.2 |
| 2,400,841 | 5/1946 | Rogers | 244/114 R |
| 2,421,512 | 6/1947 | Leitch et al. | 244/114 R |
| 3,006,288 | 10/1961 | Brown | 244/137.1 |
| 3,112,904 | 12/1963 | Reams | 244/114 R |
| 3,605,935 | 9/1971 | Gilbert | 244/118.2 |
| 3,618,875 | 11/1971 | Kappus | 244/23 R |
| 3,783,618 | 1/1974 | Kawamura | 244/23 B |
| 3,916,588 | 11/1975 | Magill | |
| 4,458,864 | 7/1984 | Colombo et al. | 244/118.5 |
| 4,571,157 | 2/1986 | Eickmann | |
| 4,613,098 | 9/1986 | Eickmann | |
| 4,771,967 | 9/1988 | Gelbaugh | |
| 4,913,377 | 4/1990 | Eickmann | |
| 5,131,605 | 7/1992 | Kress | |

*Primary Examiner*—Galen L. Barefoot
*Attorney, Agent, or Firm*—Mark A. Oathout

[57] ABSTRACT

The invention relates to a mass transit method including a docking terminal where passengers are loaded onto a craft with integral passenger pod. The craft lifts vertically from the docking terminal until it reaches an appropriate commuting altitude within 1,000 feet of the ground at which time the craft will fly to a second docking terminal and vertically descend to the second terminal for unloading of passengers. The commuting routes are networked to create an urban-suburban-rural mass transit system. The utility area of the craft can be detached and replaced. For instance, a passenger pod can be interchanged with a cargo, an emergency medical service (rescue) or a military unit pod for an innovative and versatile means of transportation.

10 Claims, 6 Drawing Sheets

VERTICAL TAKEOFF AND LANDING MASS TRANSIT SYSTEM AND METHOD

BACKGROUND

Currently, every major commercial city in the world is faced with the decline and decay associated with growth, over-population and bureaucracy. The lack of a modern viable and practical mass transit system further enhances this problem. The mass transit vehicles utilizing concrete and steel technology, i.e., highways and railways have definitely failed to solve present day transit problems. The Federal Highway Administration has stated:

"There are 2.1 million miles of paved roads in the United States, . . . 62% of those miles are in need of repair. Of the 573,928 bridges more than 20 feet long, 45% are deficient and are in need of rehabilitation or replacement . . . . The person who spends 20 minutes a day stuck in rush hour traffic will waste over the course of a commuting career, the equivalent of two working years. American motorists waste about 1.5 billion hours and about 1.5 billion gallons of gasoline on traffic congestion each year . . . . From 1977 to 1987 federal spending on highways has increased $6.1 billion to $12.8 billion, . . . Overall, in the past 10 years urban traffic congestion has increased by 50%."

The social trend over the last thirty years has been one of expansion to the outer urban areas of most of the major cities. As citizens followed these trends, they have had to make tremendous sacrifices to own a home, raise a family, and work in the cities. These trends have become exacerbated due to the growth and development on a national scale of the highway system and the automobile industry. The fulfillment of the "American Dream" has in its movement to "Suburbia" clogged the arteries of the freeways and extended the time to "commute" to and from the intercities.

In order for cities to maintain their sphere of influence they have had to try to hold the major corporations' central offices and headquarters in the "downtown business districts" through tax incentives and special perks. The employees of these corporations by statistics, mainly reside in the outer suburban districts. Since there is basically only one means of apparent transportation for the commute, private automobiles often clog the major routes to the inner city, thus forcing city governments to search for a "Mass Transit System" and expand highways to provide an economic means to ingress and egress the city.

City government, in conjunction with other levels of government, work feverishly to build and/or widen existing roadways, build mass transit bus lanes and/or rail systems to relieve the congested traffic conditions. This approach often produces additional problems such as construction detours, bottlenecks, and loss of tax revenue due to the need for additional land under the power of eminent domain. Additionally, consideration must be given to government planning stages which run into long delays and millions of taxpayer dollars. This is the result of using technology, systems and methods obsolete to resolve contemporary problems. This type of "Nineteenth Century Thinking" by government and industry has failed to provide a modern solution acceptable to our mobile society.

In addition to transit problems the transportation modes presently used have not successfully eliminated the pollution problem, especially in the area of mass transit transportation. Busses still emit toxic emissions above an acceptable level due to the use of diesel fossil fuels. Even though government regulation on fossil fuel burning engines has helped reduce these toxic emissions in the auto industry, buses and trucks are still a major problem.

A need, therefore, exists for a safe, fast, comfortable and inexpensive means of moving a large volume of individuals, cargo, etc. on a massive scale, in the shortest amount of time and in an environmentally conscientious manner. Such a means should also possess an efficiency and desirability of comfort that will appeal to the everyday suburban citizen in such a way as to prompt the use of mass transit over the traditional use of the automobile. Only then, can we progress into the Twenty First Century with new vision.

SUMMARY OF THE INVENTION

The invention relates to a mass transit method including a docking terminal where passengers are loaded into a passenger pod attached to the underside of a craft. The craft lifts vertically from the docking terminal until it reaches an appropriate commuting altitude within 1,000 feet of the ground at which time the craft will fly to a second docking terminal and vertically descend to the second terminal for unloading of passengers. The craft is not limited to terminal docking only but also has the capability of an independent landing system for off site uses. The passenger commuting routes are networked to create an urban-suburban-rural mass transit system.

The invention also includes a craft with a detachable and replaceable "pod". A number of different types of "pods" such as "cargo movement units", "emergency rescue medical units" as well as "pods" designed for other uses can be implemented.

In addition to the above summary of methods and uses, military applications by the various armed forces services also exist.

DETAILED DESCRIPTION

Figure 1:
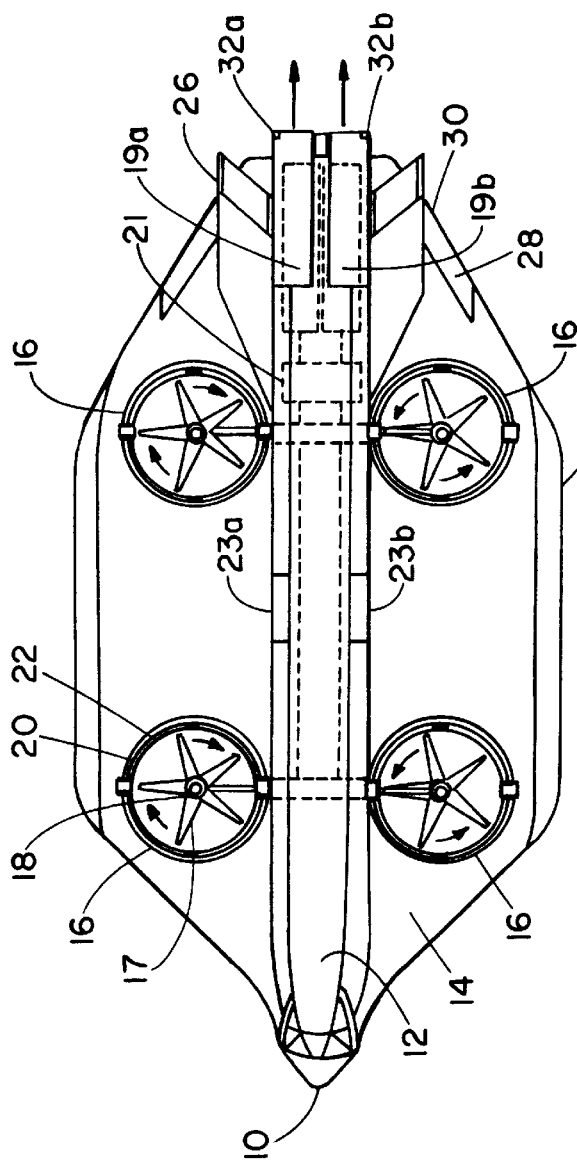
FIG. 1 is a front elevational view of the craft in flight.
Figure 3:
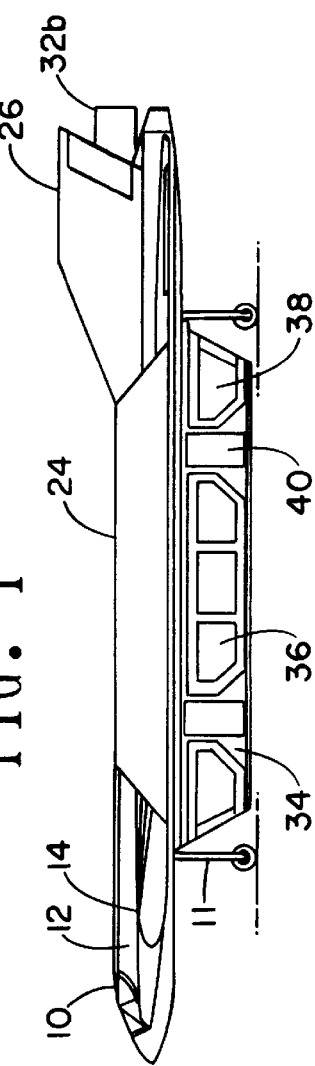
FIG. 3 is a side elevational view of the craft shown (landed mode-grade surface) with the independent landing system deployed
Figure 2:
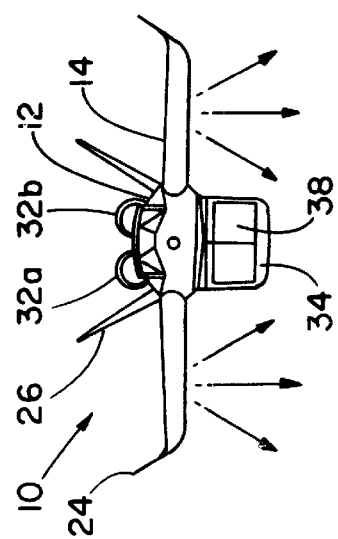
FIG. 2 is a top schematic view of the craft with the main drive systems shown.

The present invention uses an aircraft, a type of "aero-omnibus", which operates on the principals of the latest VTOL ("vertical take-off and landing") technologies. When in use, the craft 10 will takeoff and land vertically and will travel in dedicated airspace over existing main thoroughfares at altitude ranges from ground level to 1,000 feet. Referring to FIGS. 1–3, the craft 10 shall consist of a main body 12 with integral wings 14 of almost the full length of the craft 10. Each wing 14 has two variable pitch thrust/lift units 16 mounted within the wing structure.

Vertical lift is provided by the four lift units 16 which are counter rotating turbo fans 18 driven by two internally mounted turbines 19*a* and 19*b* operating as, redundant drive engines that allow for all four lift units 16 to operate with one engine 19*a* or 19*b* loss and safely land the craft. This is accomplished through a transmission unit 21 driven by the turbines 19*a* and 19*b*. The air intakes 23*a* and 23*b* amidship allow for air to be ducted to the internal mounted turbines 19*a* and 19*b*. The controls (not shown) are a state of the art "fly by wire" type computer controlled guidance system as well as manual controls to allow for a smoother and safer operation.

Each variable pitch lift unit 16 comprises a fan 18 mounted within a set of gimbal rings 20 and 22 allowing each fan 18 to be independently rotated within the X-Y planes. The independent rotatability allows pitch and roll movement for steering during vertical (or near vertical) takeoff, landing and low speed straight flight maneuvers. Independent variable pitch fan blades 17 are also included to increase or decrease the thrust of each lift unit 16. The combination of each of these variables allows for the full control of flight attitude, acceleration or deceleration for the vertical takeoff or landing as well as low speed straight flight maneuvering of the overall craft 10.

Projecting stabilizer surfaces 24 run the length of the outside of each wing 14 and two rear stabilizers 26 are included for yaw control. The trailing edges of each wing 14 shall have elevators 28 and ailerons 30 for straight flight pitch and roll control at advanced forward speeds.

The inner body turbines 19*a* and 19*b* and the transmission works 21 within the main body fuselage 12 shall be counter-rotating, one clockwise and another counter-clockwise to drive each side of the craft 10 in a counter-rotating fashion to negate the gyroscopic drive forces. The transmission 21 works to both sets of the lift units 16 from the two drive turbines 19*a* and 19*b* and shall be common and comprise a redundant drive assembly. If one drive turbine 19*a* or 19*b* fails, the other will continue to drive the four inner lift thrust units 16 to maintain a controlled attitude for a safe controlled vertical landing of the craft 10 in a horizontal position.

The variable pitch lift units 16, as described, are preferably controlled by a "fly-by wire" type computer controlled, gyro stabilized avionics system (not shown) and shall be capable of pilot control with computer back-up components for additional safety.

By way of the variable pitch lift units 16, the craft 10 has the ability to perform a right or left turn at moderately low speeds without having to execute a banking type turn performed by present day commercial aircraft. This allows the craft 10, while in flight, to maintain a constant level position at all times, enhancing the desirability of ridership, comfort, safety and other possible uses.

The craft 10 also has two forward drive turbines 32*a* and 32*b* mounted outside the main body fuselage 12 which shall constitute the main forward propulsion drives. These drive units shall be counter-rotating, one clockwise and another counter-clockwise to drive the craft 10 forward at the "Cruise" or "Moderate Speed" mode. If one drive turbine 32*a* or 32*b* fails, the other will continue to provide adequate forward power to negotiate a safe operation. The inner body turbines 19*a* and 19*b* shall be the primary landing propulsion units. The forward drive turbines 32*a* and 32*b* will be throttled down to minimum speed during vertical landing and take-off operation of the craft 10.

The craft 10 can be designed for the use of various conventional fuels for turbine drives, however, for environmental considerations, natural gas, hydrogen or other synthetic clean fuels are preferred.

The basic emissions from a natural gas turbine engine are carbon dioxide and water vapor. In addition, the noise level of the engines is equal to or less than the presently accepted criteria set by the FAA for the commercial aviation industry.

The craft 10 is designed for low altitude operation only and shall operate at moderately low speeds ranging from 150 to 225 miles per hour with a preferred maximum speed of 300 miles per hour.

The structure of the craft 10 shall be of light weight materials such as modern high-tech alloys and carbon filament composites.

A passenger pod 34 attached to the main body of the craft 12 is preferably designed to accommodate 100 to 120 people seated in comfortable swivel lounge chairs and can have built in audio/video entertainment devices as well as other amenities. The interior (not shown) can be elegantly decorated if desired but the interior decoration can range from austere to high-tech. Personal communications and electronic data processing devices can be made available to passengers. A snack bar can be located on board for passenger convenience and hostesses/hosts can be available.

Figure 5:
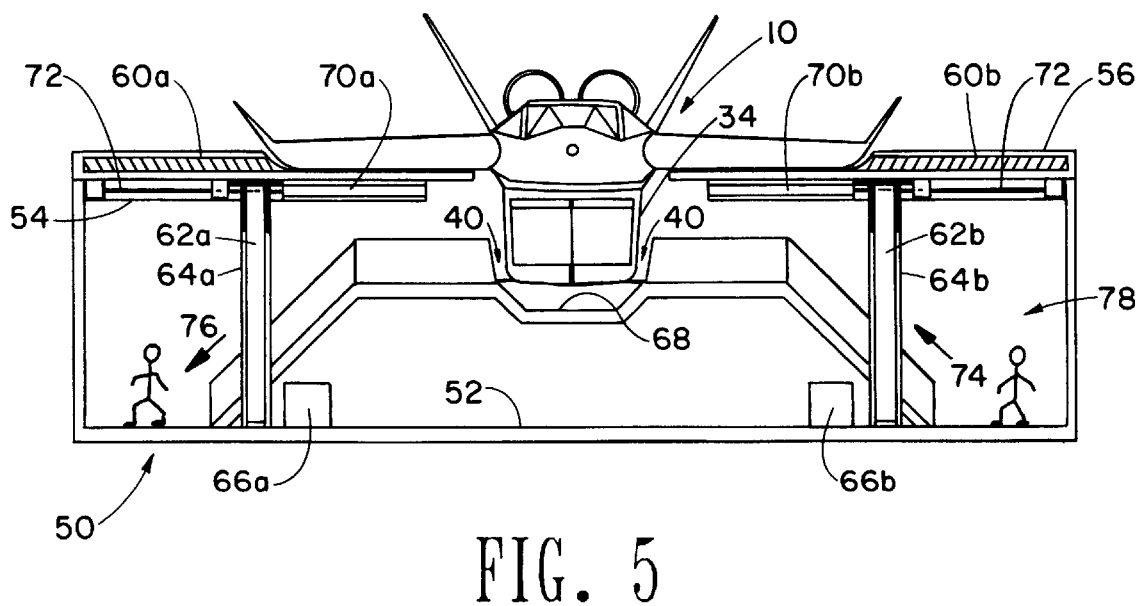
FIG. 5 is a schematic view of the craft docked at the terminal.

The structure of the passenger pod 34 is designed to provide as much light and vision as practical, by using ceiling to floor thermopane plexiglass windows 36 and wraparound thermopane plexiglass ends 38 for optimum passenger visibility. Doors 40 are preferably designed to quickly swing or slide down and under the floor area, forming a level type seal that will provide a smooth continuous floor between the passenger pod 34 and the docking terminal floors (FIG. 5).

Figure 9:
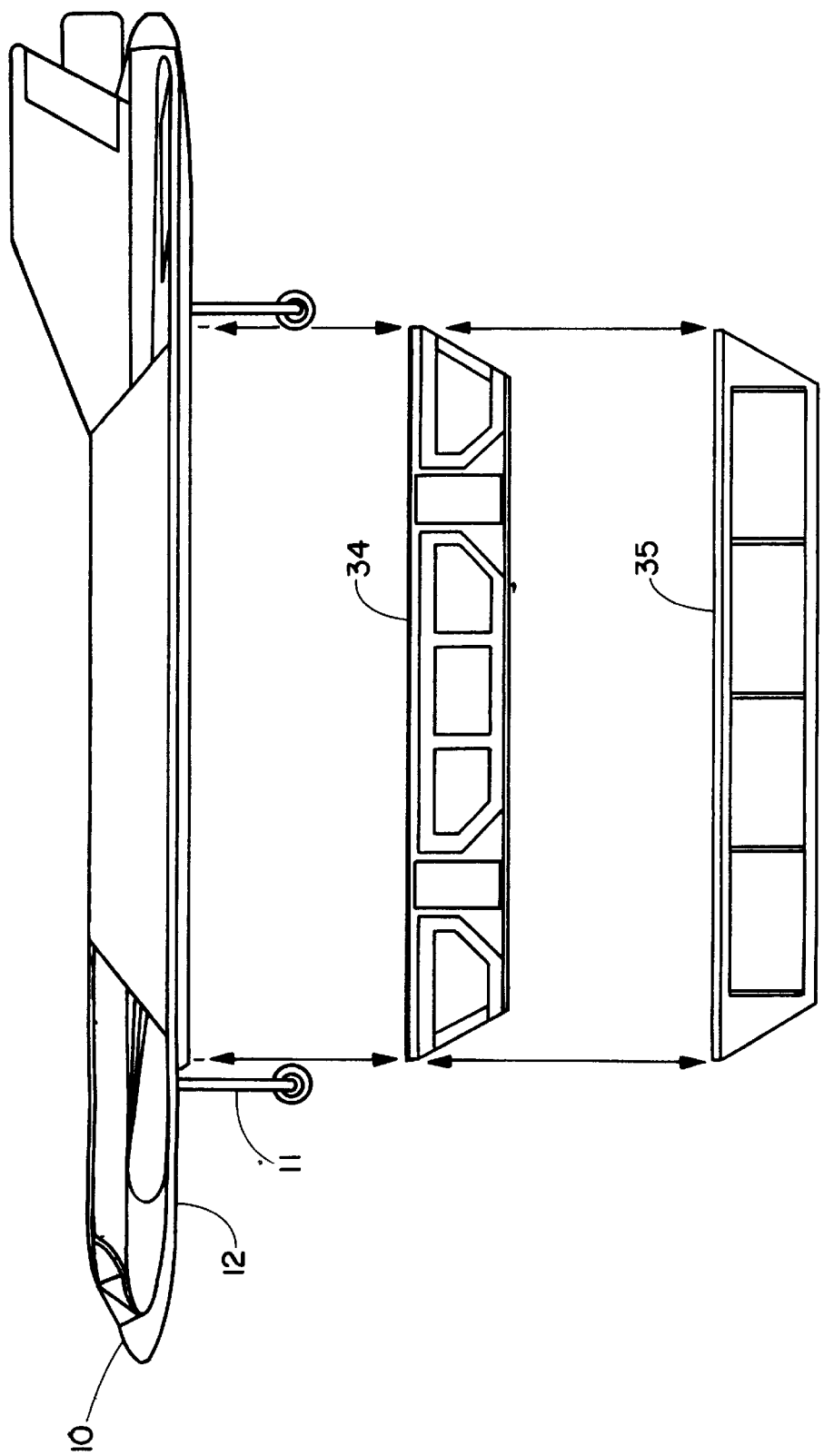
FIG. 9 is a side elevational schematic view of the detachable pod(s) as it relates to the primary craft.

Referring to FIG.9, a cargo pod 35 can be developed to replace or exchange with a passenger pod 34 for in between A.M. and P.M./passenger rush-hour periods to implement the movement of cargo goods, within the scope of light truck loads, within the operating and service area of the craft 10. The pods 34 or 35 may be changed by lowering onto a transport unit (not shown) and rolled from under the craft 10 with the craft landing gear 11 deployed in a service area.

Other special purpose pods similar to the passenger pod 34 and the cargo pod 35 can also be developed. For instance, a hospital and rescue pod could be designed as an emergency medical unit for life threatening accidents and natural disasters. Such a pod would provide a miniature hospital fully equipped to handle emergencies with doctors and nurses and could be capable of landing at or near the accident or disaster scene and of traveling to a major medical center. Emergency surgery and other life saving operations could possibly be implemented during transit.

Various types of military pods can also be developed for personnel transport, hardware transport, medical evacuation and rescue and armed platforms can be implemented.

Figure 4:
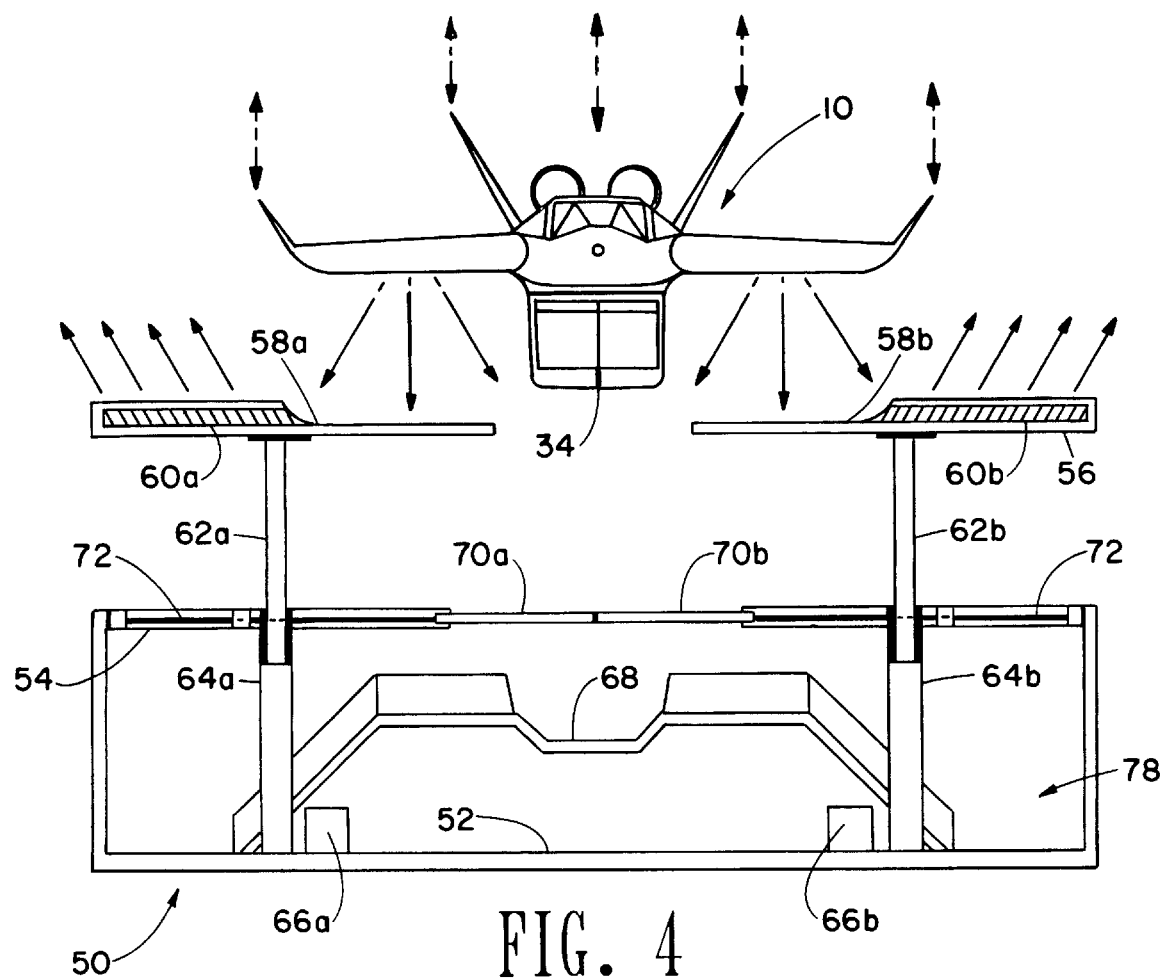
FIG. 4 is a schematic view of the craft descending over or ascending from the docking terminal.

The craft 10 may have retractable landing gear 11 (shown in FIG. 3 for reference purposes) for landing on any solid surface but the craft 10 should be designed specifically for landing in a terminal docking module 50 (FIGS. 4–5). The terminal docking modules 50 are to be used for the safe interchange of passengers. By combining the terminal docking modules 50 with the crafts 10, one can create a networked system and method of transportation to efficiently, quickly and safely move passengers within and out of any metropolitan, suburban or rural area.

The terminal docking module 50 will include a lower passenger loading area 78, roof 54, landing platform 56 and utility machinery area 52. The landing platform 56 includes a landing surface shown as 58*a* and 58*b*, each having an air suppression pad 60*a* and 60*b* for the landing of the craft 10.

The landing surface 58a and 58b is mounted on top of hydraulic piston units 62a and 62b which slide within hydraulic cylinder columns 64a and 64b. The hydraulic cylinder columns 64a and 64b are attached to the roof 54 and the utility machinery area deck 52. The utility machinery area deck 52 include hydraulic machinery 66a and 66b as well as other utility systems. The lower deck 52 also includes a passenger loading platform structure 68 to accommodate the passenger pod 34 when landed and will house the utility hydraulic units 66a and 66b and other necessary machinery. The roof 54 includes two bay doors 70a and 70b located above the passenger loading platform structure 68 and below the area where the passenger pod 34 will descend onto the passenger loading platform structure 68. The bay doors 70a and 70b are designed to retract to allow the craft 10 to descend in the landing mode. The bay doors 70a and 70b may be retracted by a screw-drive system 72 or some other acceptable means.

When no passenger pod 34 is docked or in the landing mode, the landing platform 56 should be extended as shown in FIG. 4. In this mode, the bay doors 70a and 70b should be closed. When landing, the craft 10 will descend with its lift units 16 "on" over the pads 58a and 58b and at an appropriate time after the drive units throttle down the bay doors 70a and 70b should be opened. When the craft 10 has actually landed on the pads 58a and 58b, the hydraulic pistons 62a and 62b will descend to lower the passenger pod 34 into the terminal 50. When the passenger pod 34 has completely descended on the platform 56, the bay doors 70a and 70b to the roof 54 will be opened (FIG.5). The hydraulic pistons 62a and 62b will lower the craft 10 thus placing the passenger pod 34 into the passenger loading area 78. The doors 40 can then be opened and passengers can enter on one side 74 of the passenger pod 34 and exit on the opposite side 76 as shown in FIG. 5.

When the craft 10 has completely descended into the terminal docking module 50, only the passenger pod 34 will enter the terminal compartment 78. The terminal docking module 50 is only one example of a suitable landing structure for the craft 10 and other landing surfaces and structures can be implemented into the system and method as well.

The prefabricated docking terminal modules 50 will compliment the luxury of the passenger pod 34 by incorporating many of the same amenities used in the passenger pods.

Figure 6:
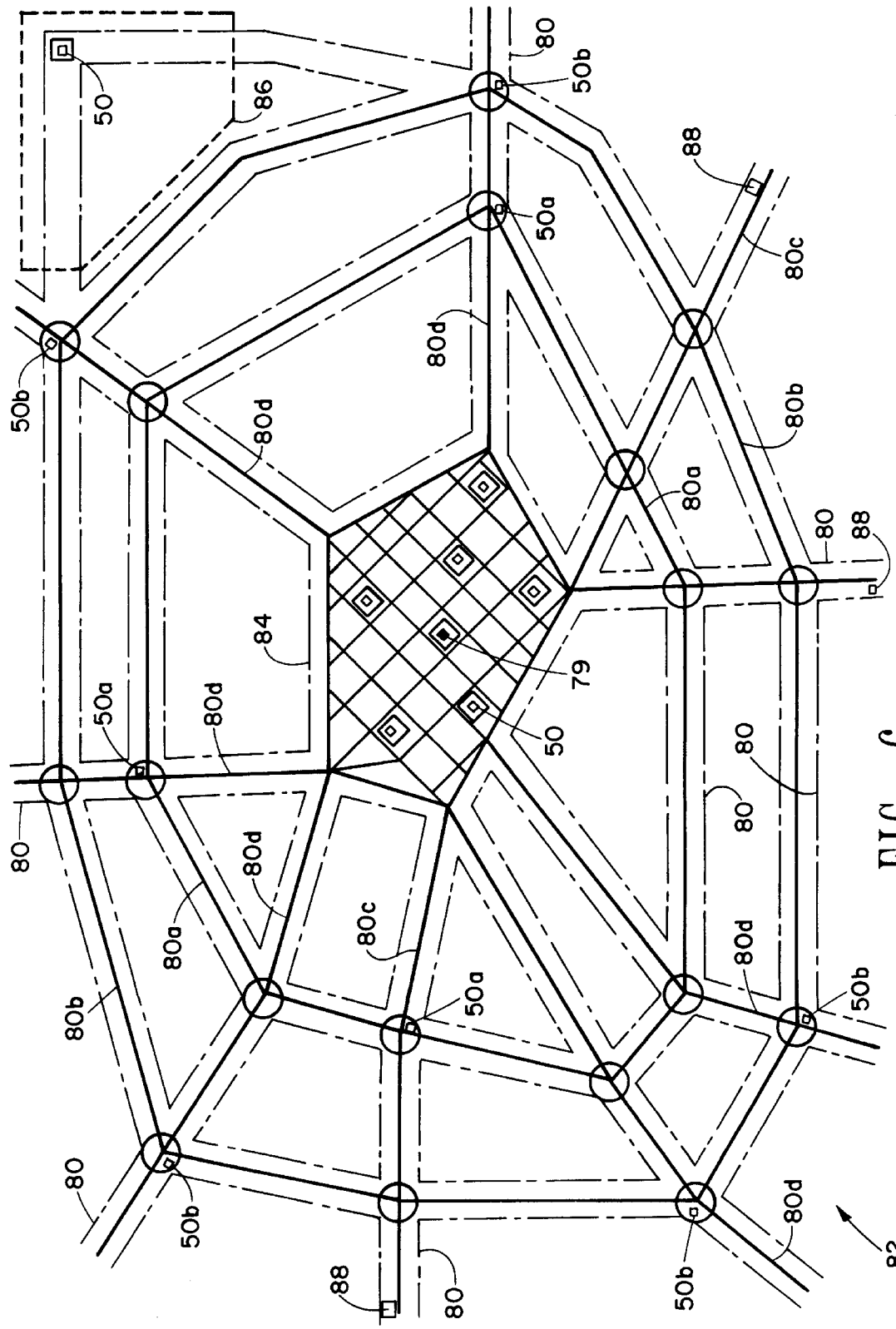
FIG. 6 is a schematic view of a network of commuting routes.
Figure 7:
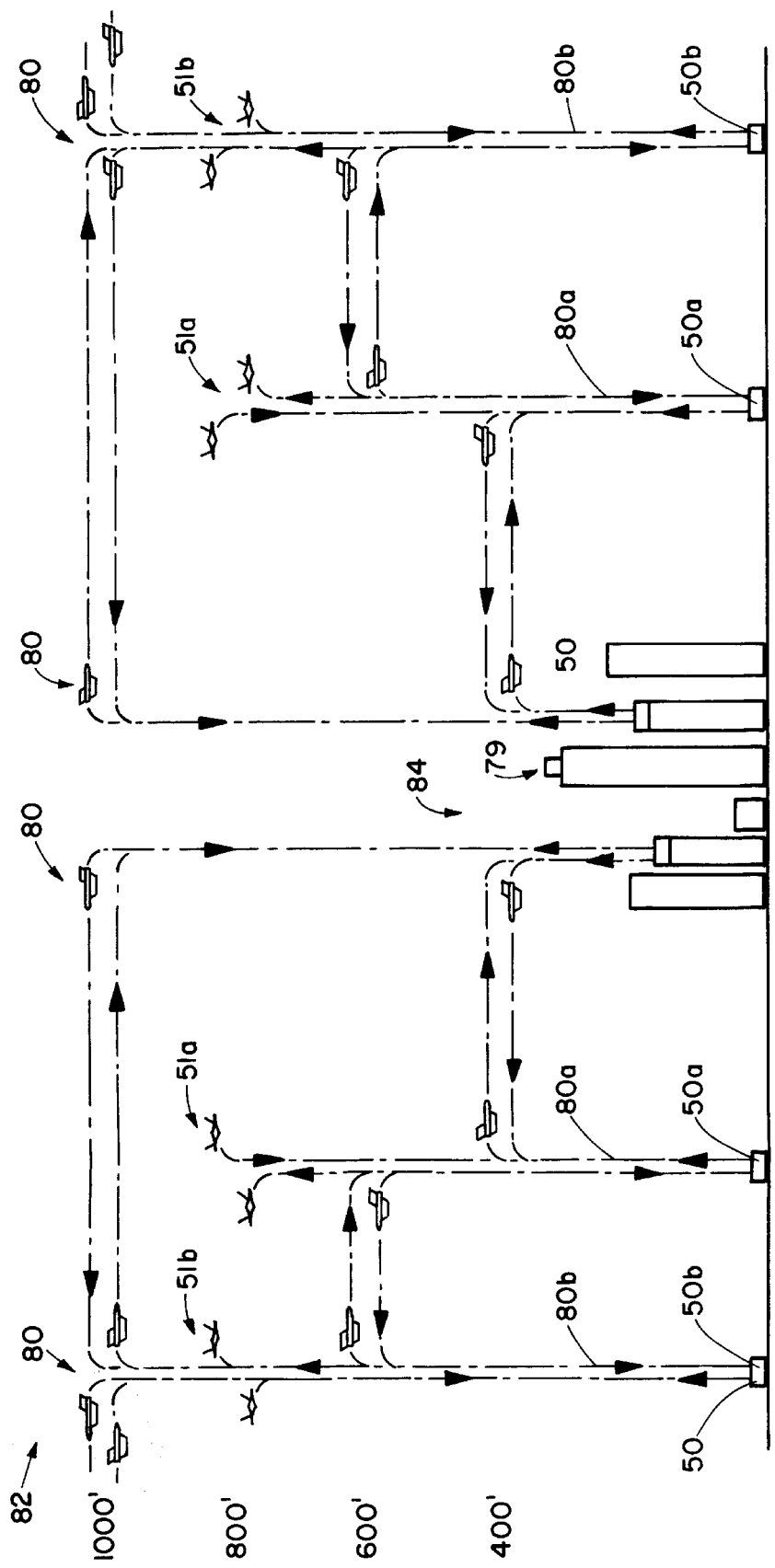
FIG. 7 is an elevational view of commuting routes shown in FIG. 6.

Referring to FIGS. 6 and 7, a system of transit zones or commuting routes 80 consist of narrow rectangular areas imposed over various highway or freeway routes ingressing and egressing the city to be served. A typical greater metropolitan area 82 can be networked with the interconnection of docking terminals 50 and commuting routes 80. The commuting routes 80 can be located above existing highways or throughways such as an innerbelt route 80a, an outerbelt route 80b, over interstate highways 80c, freeways 80d, etc. Docking terminals 50 are to be located at the points of intersection of the commuter routes 80 at appropriate central business district locations 84 and at other appropriate locations such as airports 86, sports complexes, etc. The terminal buildings/modules 50 can be located in major suburban shopping malls 88 which already have available parking space and merchants.

The altitudes of commuting routes 80 can be varied and arranged for efficiency and safety such as for example a 400 foot altitude for commuting between an innerbelt terminal 50a and the central business district 84, a 600 foot altitude for commuting between an outerbelt terminal 50b and an innerbelt terminal 50a, an 800 foot level for commuting an innerbelt terminal circuit 51a and/or an outerbelt terminal circuit 51b and a 1,000 foot altitude for commuting between an outerbelt terminal 50b and the central business district 84 as well as rural terminals (not shown). Other commuting systems utilizing the invention described with variable altitude schemes can be devised. In another example, a craft 10 traveling clockwise around the innerbelt commuter route circuit 51a could travel at a certain altitude whereas another craft operated at a higher altitude could travel counterclockwise around the innerbelt route circuit 51a so that routes having a different azimuth on the innerbelt route 80a would not interfere. The outerbelt route circuit 51b would be similar.

A centralized command center 79 could coordinate, control and dispatch the craft 10 for a safe and efficient overall operation.

When passenger peak travel time subsides, the crafts 10 could be rotated out of passenger service to a service area where a cargo pod 35 (FIG. 9) could be interchanged for shipment of light truck loads to maximize the economy of the system as well as to relieve the freeways of additional truck vehicles.

Figure 8:
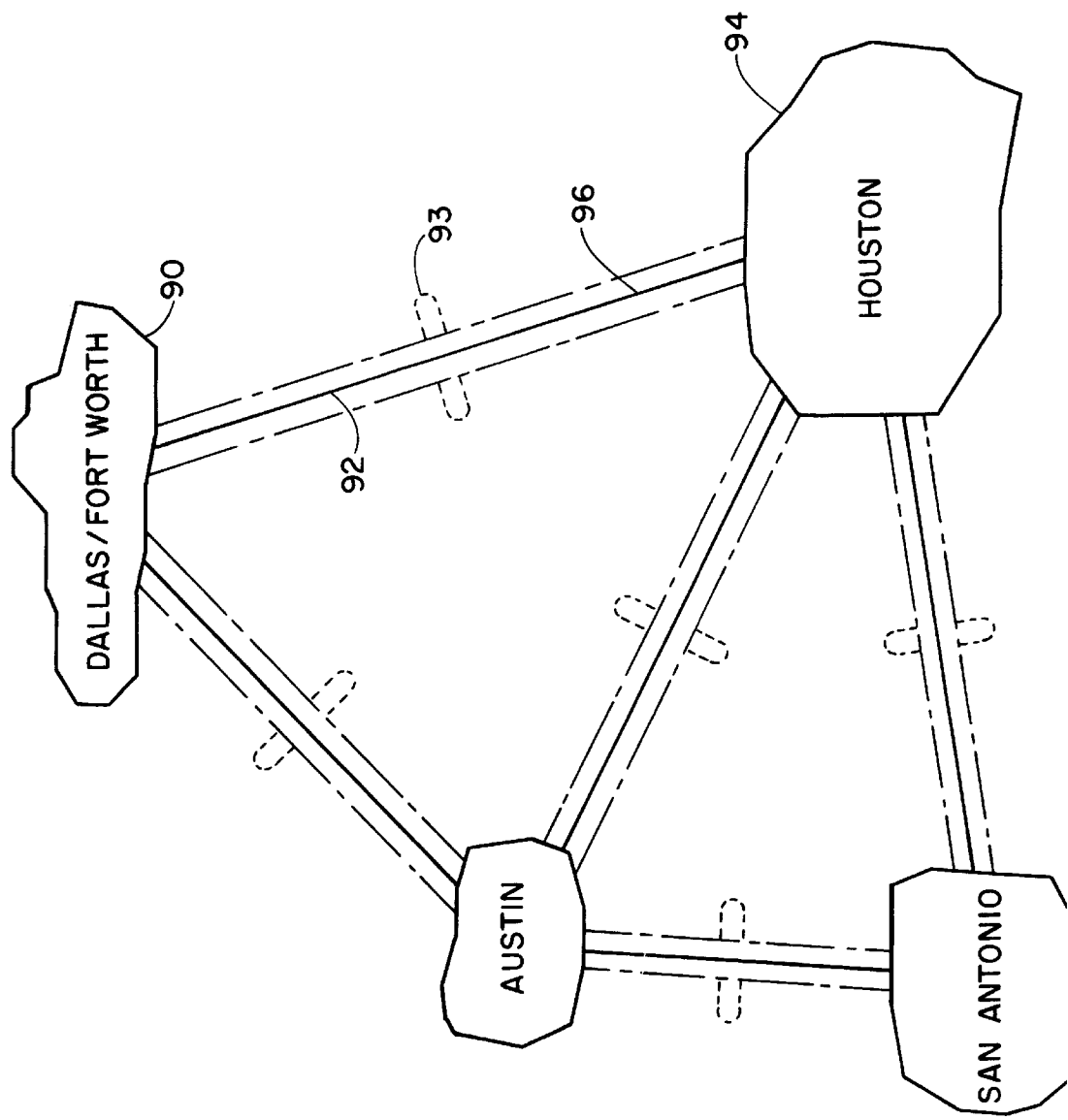
FIG. 8 is a schematic view of the system networking four cities.

Referring to FIG. 8 a city can be linked to nearby cities and rural areas using the invention. By way of example there are approximately 240 miles between Dallas/Fort Worth, Tex. and Houston, Tex., and approximately 200 miles between Houston, Tex. and San Antonio, Tex. A Dallas/Fort Worth based craft system 90 can use an interstate transit route 92 over an interstate highway which would extend 120 miles toward Houston. Commuters could then live as far out as 120 miles and still commute to and from Dallas/Fort Worth within a reasonable time element. This will create a new zone of economic desirability 93. A Houston based craft system 94 could extend 120 miles over an interstate highway 96 towards Dallas/Fort Worth in a similar fashion. Commuters residing within the midway zone 93 could opt for working in Houston or Dallas/Fort Worth. Similar zones could be established between Houston and San Antonio and between San Antonio, Austin and Dallas/Fort Worth. This greatly impacts the future of individual mobility, residential patterns, business development, growth and job opportunities, cultural exchange and allows the cellular networking of metropolitan areas.

The need for land right-of-ways and eminent domain is virtually non-existent except in certain areas where a docking terminal 50 is to be located. The airline industry is already restricted from using the routes and altitudes to be used by the craft 10 except near airports. But airport takeoff and landing conflicts can be removed through scheduling, respecting right-of-way, etc. Since the craft 10 operates somewhat like a helicopter in ascending and descending, there is no need for construction of any major consequence. Other than the construction of terminal buildings 50 at specific sites, the construction involved is minimized. The terminal buildings 50 are intended to be prefabricated and therefore can be put into service within a relatively short period of time.

Once engineers, urban planners, architects and designers have designed a craft and operating system for population centers, business centers, rural routes, terminal cites, etc. the time within which the system can be fully operational is expected to be within one year or less. This method of transportation should be obviously favorable to municipal governments because of the nonexistent need of exercising powers for purposes of land confiscation and the great reduction in long, costly and arduous years of construction work commonly required for rail and road type systems.

It should be obvious that the overall simplicity of this transportation method has great economic impact both from a local scale to national and international proportions. Many new industries and jobs could be created effectively enhancing the economy for decades to come.

The preferred embodiment of the invention has been described. Various departures can be made from the preferred embodiment as described without varying from the spirit of the invention as claimed.

What is claimed is:

1. A mass transit system comprising:
    a plurality of routes running in varying directions to form a network;
    a plurality of terminals located at points of intersection of the plurality of routes wherein said terminals include:
        a pair of hydraulic platforms extendable from a roof of said terminals;
        a bay door located in the roof of said terminals and between said hydraulic platforms; and
        a passenger loading and unloading compartment located below the bay doors and the roof
        said plurality of routes being located above the ground in regions between the terminal;
        said plurality of routes extending from an urban area to a suburban area; and
        a craft which takes off and lands from said terminals and travels along said plurality of routes, said craft including a means for vertical takeoff and landing and a means for horizontal drive located thereon.

2. The mass transit system according to claim 1 wherein said craft includes a detachable and replaceable pod.

3. The mass transit system according to claim 2 wherein said pod is a passenger pod.

4. The mass transit system according to claim 2 wherein said pod is a cargo pod.

5. The mass transit system according to claim 2 wherein said pod is a medical pod.

6. The mass transit system according to claim 2 wherein said pod is a military pod.

7. The mass transit system according to claim 1 wherein the plurality of routes are located above a plurality of existing roadways.

8. A mass transit system comprising:
    a plurality of routes running in varying directions to form a network;
    a plurality of terminals located at points of intersection of the plurality of routes, said plurality of routes being located above the ground in regions between the terminals;
    said plurality of routes extending from an urban area to a suburban area; and
    a craft which takes off and lands from said terminals and travels along said plurality of routes, said craft including a means for vertical takeoff and landing and a means for horizontal drive located thereon;
    wherein the plurality of routes further comprise:
        a first commuting route ascending vertically from one of the terminals to an altitude of 400 feet, traveling at the altitude of 400 feet to another of the terminals and descending vertically;
        a second commuting route ascending vertically from one of the terminals to an altitude of 600 feet, traveling at the altitude of 600 feet to another of the terminals and descending vertically;
        a third commuting route ascending vertically from one of the terminals to an altitude of 800 feet, traveling at the altitude of 800 feet to another of the terminals and descending vertically; and
        a fourth commuting route ascending vertically from one of the terminals to an altitude of 1,000 feet, traveling at the altitude of 1,000 feet to another of the terminals and descending vertically.

9. The mass transit system according to claim 8 wherein the plurality of routes further extend to a rural area.

10. An urban-suburban mass transit method comprising:
    placing a plurality of terminals at appropriate locations within an urban-suburban area;
    loading passengers onto a first craft located at one of the terminals;
    lifting the first craft in a vertical direction to a first altitude within 1000 feet of the ground;
    flying the first craft at the first altitude to another of the terminals;
    landing the first craft in a vertical direction;
    unloading passengers from the first craft;
    contemporaneously loading passengers onto a second craft located at one of the terminals;
    lifting the second craft in a vertical direction to a second altitude within 1000 feet of the ground;
    flying the second craft at the second altitude to another of the terminals;
    landing the second craft in a vertical direction;
    unloading passengers from the second craft;
    contemporaneously loading passengers onto a third craft at one of the terminals;
    lifting the third craft in a vertical direction to a third altitude within 1000 feet of the ground;
    flying the third craft at the third altitude to another of the terminals;
    landing the third craft in a vertical direction; and
    unloading passengers from the third craft.

* * * * *